United States Patent
Manoj

(10) Patent No.: US 7,398,416 B2
(45) Date of Patent: Jul. 8, 2008

(54) PROACTIVE DRIVER RESPONSE TO AN OPERATING SYSTEM IF A DRIVE IS REMOVED FROM A RAID CONFIGURATION

(75) Inventor: Jose K. Manoj, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 535 days.

(21) Appl. No.: 11/049,471

(22) Filed: Feb. 2, 2005

(65) Prior Publication Data

US 2006/0174166 A1 Aug. 3, 2006

(51) Int. Cl.
G06F 11/00 (2006.01)
(52) U.S. Cl. .......................................................... 714/5
(58) Field of Classification Search ...................... 714/5, 714/7
See application file for complete search history.

(56) References Cited

U.S. PATENT DOCUMENTS

| 6,178,520 B1 * | 1/2001 | DeKoning et al. ............. 714/5 |
| 2001/0020277 A1 * | 9/2001 | Deenadhayalan et al. ... 713/323 |
| 2006/0010343 A1 * | 1/2006 | Tanaka et al. .................. 714/7 |

* cited by examiner

Primary Examiner—Yolanda L Wilson
(74) Attorney, Agent, or Firm—Christopher P Maiorana, PC

(57) ABSTRACT

A method for responding to a particular drive being removed from a drive array, comprising the steps of (A) determining a maximum drive response time of the particular drive being removed from the drive array; (B) determining a duration of each of one or more commands needing completion; (C) if a particular one of the commands takes longer than the maximum drive response time, aborting the particular command and checking if the drive is physically present; and (D) if the command takes less than the maximum drive response time, completing the command.

17 Claims, 3 Drawing Sheets

PROACTIVE DRIVER RESPONSE TO AN OPERATING SYSTEM IF A DRIVE IS REMOVED FROM A RAID CONFIGURATION

FIELD OF THE INVENTION

The present invention relates to drive arrays generally and, more particularly, to a proactive driver response to an operating system if a drive is removed from a RAID configuration.

BACKGROUND OF THE INVENTION

For a conventional redundant array of inexpensive drives (RAID), a driver takes time to detect when a drive is removed. If the drive is removed from the RAID configuration, the driver will wait for an IO time out from the operating system and later cause a controller to reset. Such a time out and reset is time consuming and freezes the system during the process.

Conventional approaches to detect a drive being removed from a RAID configuration often use a soft RAID solution. The soft RAID solution depends on an operating system (OS) layer IO time out to detect a drive removal. More specifically, an operating system subsystem layer (such as a Linux SCSI layer) typically has a time out period of more than 30 seconds. In some Linux kernels (or SCSI subsystem layers), a time out period can be up to 90 seconds. Since a soft RAID configuration depends on the Linux SCSI layer time out to determine if the drive is removed, the driver will take more time to detect such a drive removal. Conventional solutions are not able to prevent an IO timeout if a drive is removed from a healthy RAID configuration.

It would be desirable to implement a proactive driver response in an operating system that detects if a drive is removed from a drive array.

SUMMARY OF THE INVENTION

The present invention concerns a method for responding to a particular drive being removed from a drive array, comprising the steps of (A) determining a maximum drive response time of the particular drive being removed from the drive array; (B) determining a duration of each of one or more commands needing completion; (C) if a particular one of the commands takes longer than the maximum drive response time, aborting the particular command and checking if the drive is physically present; and (D) if the command takes less than the maximum drive response time, completing the command.

The objects, features and advantages of the present invention include providing a driver configuration that may (i) provide a proactive response if a drive is removed from the system, and/or (ii) detect a drive removal before an operating system time out.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention provides a solution that makes use of a lengthy operating system time out duration and better response time in drives that are used in a RAID configuration. A typical Operating System (OS) will have more than roughly 30 seconds for a timeout parameter (e.g., command_time_out). However, almost all currently available drives are capable of finishing commands within roughly 15 seconds.

Figure 1:
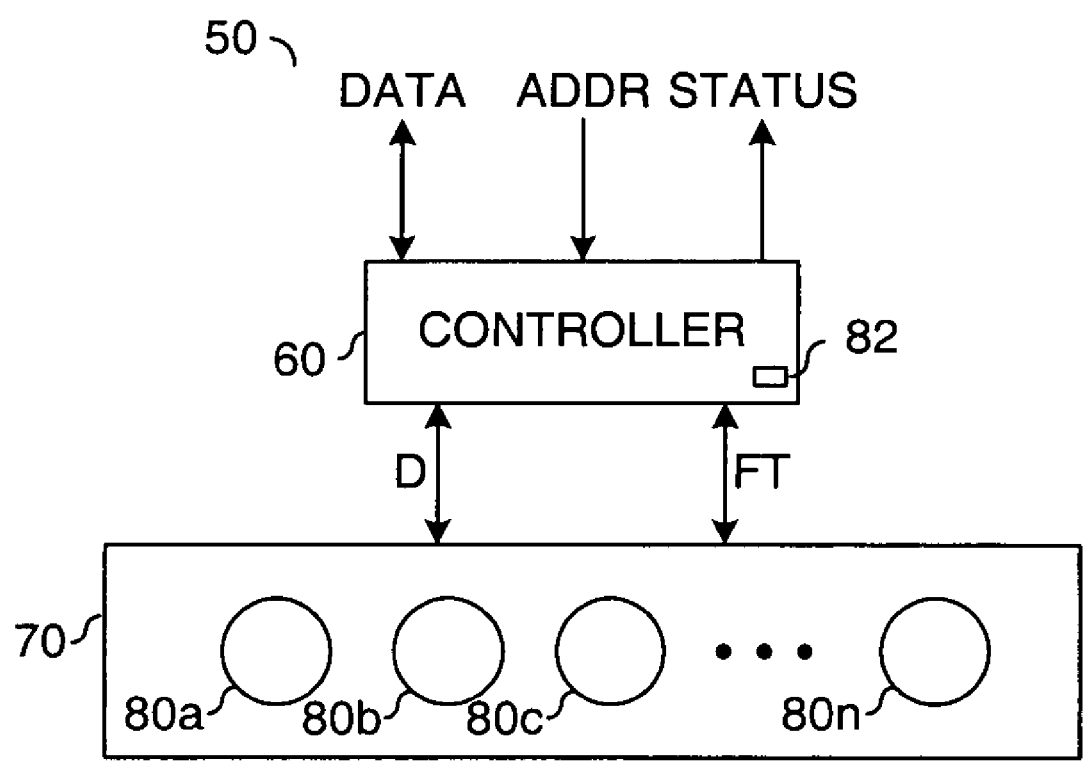
FIG. 1 is a diagram illustrating a context of the present invention.

Referring to FIG. 1, a block diagram of an example implementation of a system 50 is shown. The system 50 generally comprises a circuit 60 and a circuit 70. The circuit 60 may be implemented as a disc array controller. The circuit 70 may be implemented as a disc array (e.g., a RAID configuration). The circuit 70 generally includes a number of drives 80a-80n. While four drives 80a-80n are shown, the particular number of drives may be varied to meet the design criteria of a particular implementation. A chip 82 may be implemented within the controller 60 to store instructions for implementing the driver of the present invention. For example, the chip 82 may be configured to hold a computer readable medium configured to implement a number of steps. The chip 82 may be implemented as an integrated circuit (IC), such as an application specific integrated circuit (ASIC).

A signal (e.g., DATA) may transfer data items to and from the controller 60. A signal (e.g., ADDR) may transfer an address associated with the data to the controller 60. One or more optional signals (e.g., STATUS) may present status information from the controller 60. One or more signals (e.g., D) may exchange the data items between the controller 60 and the disc array 70. One or more signals (e.g., FT) may exchange fault tolerance items between the controller 60 and the disc array 70.

The controller 60 may be operational to map the information in the signal DATA to the individual disc drives 80a-80n within the disc array 70. The mapping may be dependent on the particular configuration of the disc drives 80a-80n that make up the disc array 70. The disc array 70 may be configured as a level 1 RAID, a level 5 RAID, a level 6 RAID, a level 10 RAID or a level 0+1 RAID. Other RAID configurations may be implemented to meet the criteria of a particular implementation.

The signal DATA may carry user data and other data to and from the apparatus 50. The data items within the signal DATA may be arranged in blocks, segments or other configurations. Addressing for the data items may be performed in the signal ADDR using logical blocks, sectors, cylinders, heads, tracks or other addressing scheme suitable for use with the disc drives 80a-80n. The signal STATUS may be deasserted (e.g., a logical FALSE level) when error detection circuitry within the controller 60 detects an error in the data read from the disc array 70. In situations where no errors are detected, the signal STATUS may be asserted (e.g., a logical TRUE level).

The signal D may carry the data information. The data information may be moved as blocks or stipes to and from the disc array 70. The signal FT may carry fault tolerance information related to the data information. The fault tolerant information may be moved as blocks or stipes to and from the disc array 70. In one embodiment, the fault tolerant information may be mirrored (copied) versions of the data information. In another embodiment, the fault tolerance information may include error detection and/or error correction items, for example parity values.

Figure 2:
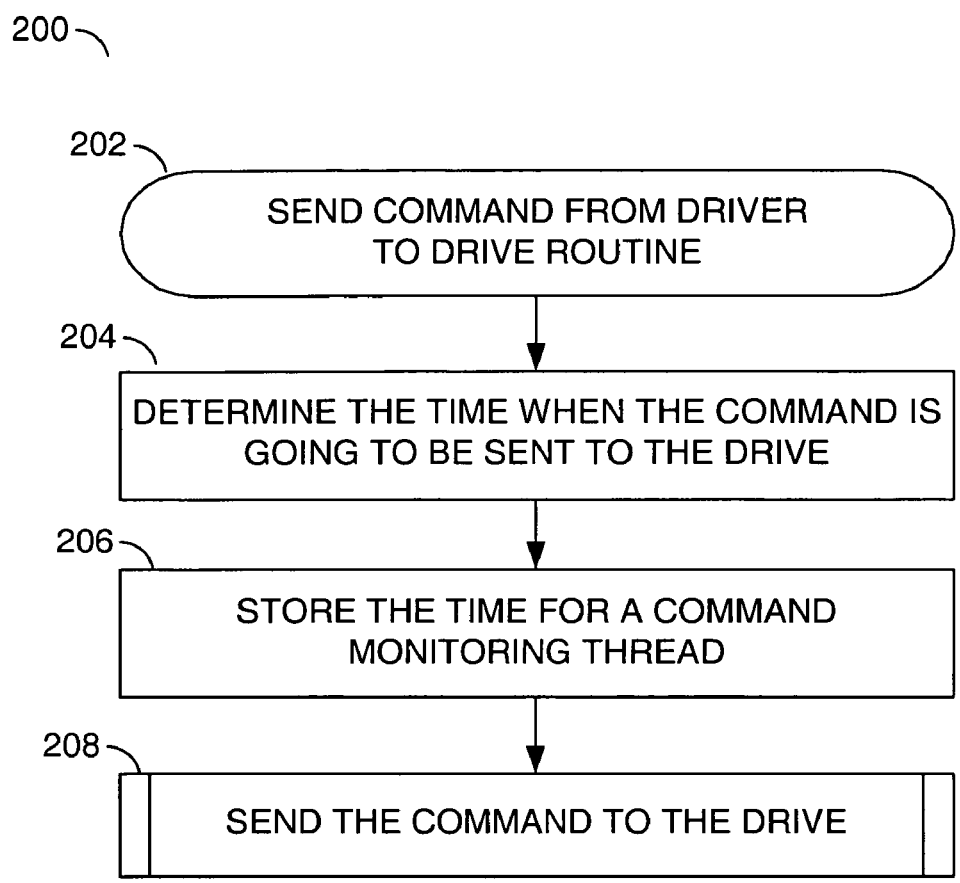
FIG. 2 is a diagram illustrating an embodiment of the present invention.

Referring to FIG. 2, a block diagram of a process 200 is shown in accordance with a preferred embodiment of the present invention. The process 200 may implement a command time register process. The process 200 generally comprises a state 202, a state 204, a state 206 and a state 208. The state 202 generally initiates a send command to a driver disposed within the chip 82 of the controller 60. The state 204 generally determines and registers a time when the command is going to be sent to a particular one of the drives 80a-80n. The driver normally determines the time before sending the command to the particular one of the drives 80a-80n. The state 206 generally stores the time when the command is going to be sent for a command monitoring thread (to be described in more detail in connection with FIG. 3). The time is stored in the physical drive information structure of the driver. The state 206 generally sends the command to any of the drives 80a-80n in the disc array 70 after the time has been stored.

Figure 3:
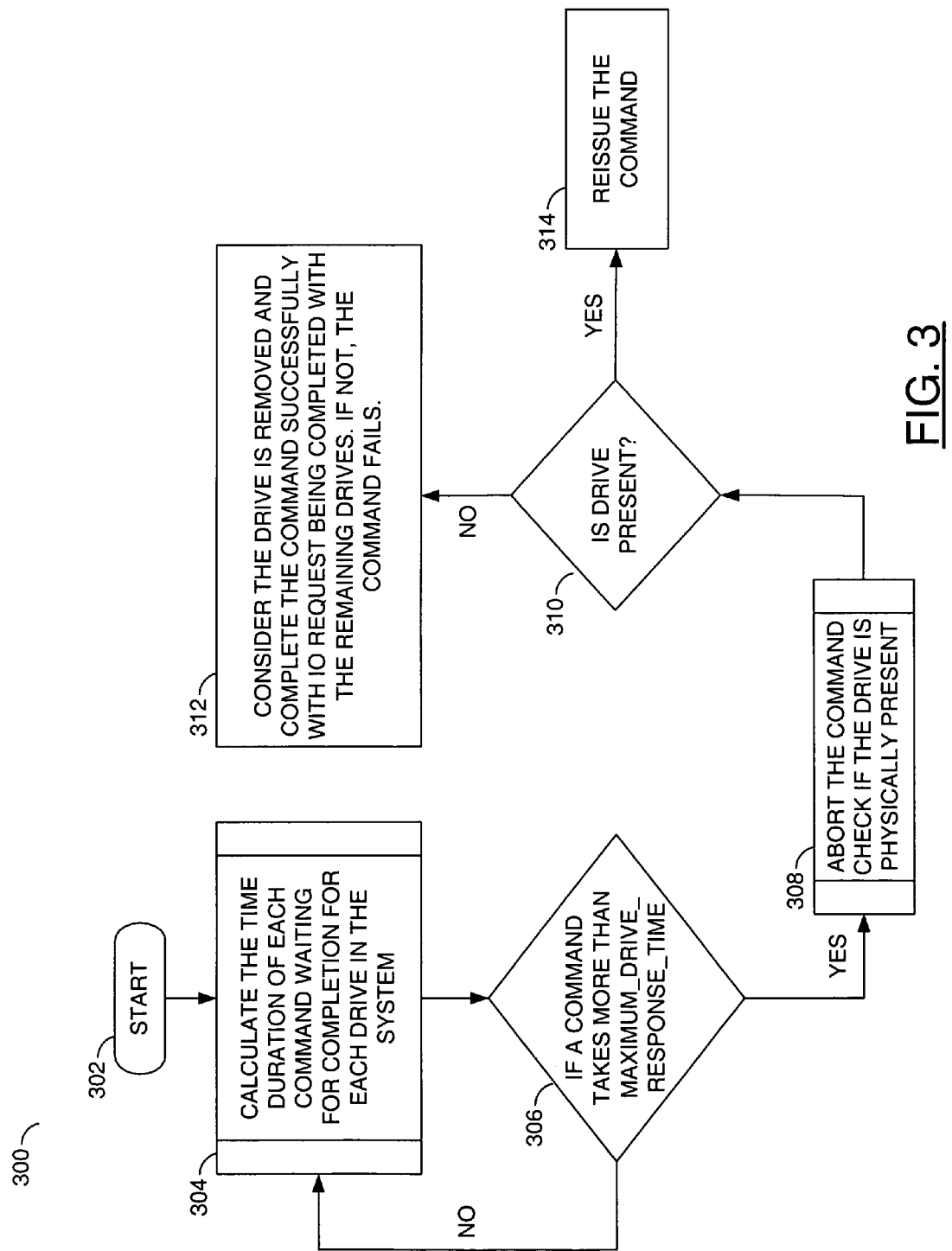
FIG. 3 is a diagram illustrating a command monitoring process.

Referring to FIG. 3, a block diagram of a process 300 illustrating a command monitoring thread (or routine) is shown. The process 300 generally comprises a start state 302, a state 304, a decision state 306, a state 308, a decision state 310, a state 312 and a state 314. After the start state 302, the process 300 moves to the state 304. The state 304 calculates the time duration of each command waiting for completion for each drive 80a-80n in the system. As noted above, the process 200 establishes when the command will be sent to any of the drives 80a-80n. Next, the decision state 306 determines if a command takes more time to execute than a parameter (e.g., maximum_drive_response_time). If not, the method 300 moves back to the state 304. If so, the method 300 moves to the state 308. The state 308 aborts the command check if a particular one of the drives 80a-80n being checked is physically present. Next, the decision state 310 determines if the particular one of the drives 80a-80n is present. If so, the method 300 moves to the state 314 which reissues the command. If not, the method 300 moves to the state 312. The state 312 considers whether a particular drive (e.g., the drive 80a) is removed and completes the command successfully with an IO request being completed with the remaining drives (e.g., the drives 80b-80n). Otherwise, the command fails.

The command monitoring routine 300 monitors the commands send to each of the individual drives 80a-80n in the disc array 70. The command monitoring thread 300 generally registers a time when the command is sent to any of the drives 80a-80n. The command monitoring thread 300 monitors whether the command monitoring routine 300 finishes within the parameter maximum_drive_response_time (e.g., 15 sec). However, the parameter maximum_drive_response_time may be adjusted to meet the design criteria of a particular implementation. If the command monitoring routine 300 detects that the command is not finished within the parameter maximum_drive_response_time, then the driver may decide that a particular one of the drives 80a-80n has been removed. A RAID engine using the driver is notified by the command monitoring routine which of the drives 80a-80n has failed to respond. The RAID engine may try to recover the failed one of the drives 80a-80n by resetting the failed drive or by completely taking the failed drive out of the RAID configuration. The present invention may detect whether one or more of the drives 80a-80n has failed to respond. If one or more of the drives 80a-80n is removed, an attempt to complete the IO command successfully will be attempted with the remaining drives 80a-80n. If one or more of the drives 80a-80n are removed, the disc array 70 may operate in a degraded mode. The drive data transfer speed can determine the parameter maximum_drive_response_time during the loading of the driver. The driver has to use some predefined values suitable for each drive speed. Otherwise, the method 300 issues a fail command.

The RAID engine may complete the command successfully in the upper layer if the RAID system is able to write/read data to/from the remaining drives 80a-80n. The upper layer may be implemented, in one example, as the Linux SCSI mid layer communicating between the kernel and the SCSI drivers. In a typical Linux RAID devices are often reported as SCSI drives. Serial ATA (SATA) drives are often reported as SCSI devices. While current applications do not offer a SATA midlayer in a Linux kernel, the present invention will apply to such systems when they are available. In particular, the present invention may be used on any Kernel Layers (IDE, SCSI, SATA, SAS, etc.), since the present invention does not depend upon midlayer timeouts. Rather, the present invention uses the fact that midlayer timeout might occur after 45-90 seconds to process a command time out even before the Midlayer time out happens.

By using the present invention, the driver will prevent an IO time out when one or more of the drives 80a-80n in the disc array 70 is removed. The present invention normally responds to the operating system much quicker than an OS time out and typically detects a drive removal before an OS time out. The driver will not normally receive a time out command if one or more of the drives 80a-80n is removed from the disc array 70 and if the driver is able to write data to a mirror drive (e.g., another one of the drives 80a-80n that writes redundant data) successfully. A user will normally not see an IO time out if one or more of the drives 80a-80n is removed from the disc array 70. The present invention makes the removal of one or more of the drives 80a-80n a smooth process. In particular, there will not normally be a lengthy driver freeze when one or more of the drives 80a-80n are removed.

Consider the example where the drive 80a is one of the drives 80a-80n within the disc array 70 (e.g., the RAID configuration) and the disc array 70 includes a total of ten drives 80a-80n. In the state 304, a user establishes the parameter maximum_drive_response_time which, in one example, may be 15 sec. The parameter maximum_drive_response_time is defined as the time duration of each command waiting for completion to the drive 80a. The parameter maximum_drive_response_time may be adjusted to meet the design criteria of a particular implementation. In decision state 306, a command is sent to the drive 80a. The command monitoring thread 300 determines if the command has finished within the parameter maximum_drive_response_time of 15 sec. If the command has finished within 15 sec, the process 300 moves from the decision state 306 to the state 304. The process continues to monitor subsequent commands sent to the drive 80a to determine if the commands have finished within 15 sec. If the command monitoring thread 300 detects that the command sent to the drive 80a has not finished within 15 sec, the process 300 to the state 308. The state 308 aborts the command. In the decision state 310, the driver will determine whether the drive 80a has been removed. If the drive 80a was removed, the command monitoring thread 300 informs the RAID engine that the drive 80a has been removed. The RAID engine may try to recover the drive 80a by resetting the drive 80a or by taking the drive 80a out of the RAID configuration 70. If the drive 80a is removed, the process 300 moves to the state 312. The state 312 attempts to complete the command with an IO request in the remaining nine drives 80b-80n. If the remaining nine drives 80b-80n cannot complete the command, the command will fail.

Due to the drive 80*a* being removed, the disc array 70 may operate in a degraded mode. In order to complete the command successfully, the RAID engine may be able to read/write data from the remaining nine drives 80*b*-80*n* while in the degraded mode. If the first drive 80*a* is present, the process 300 moves from the decision state 310 to the state 314 and the command is reissued to the drive 80*a*. A determination is made on whether the time duration of the reissued command is within the parameter maximum_drive_response_time.

The present invention normally allows the command monitoring thread 300 to monitor each command sent to any of one of the drives 80*a*-80*n* to determine if the command has finished within the maximum_drive_response_time. The process 300 has the capability of monitoring whether one or more of the drives 80*a*-80*n* have been removed. An IO request will be sent to the remaining drives 80*a*-80*n*. Additionally, for the drives 80*a*-80*n* that have been detected as being removed from the disc array 70, the driver will reissue the command to each of the individual drives 80*a*-80*n* removed from the disc array 70.

In a degraded RAID configuration (i.e., where at least one individual of the drive 80*a*-80*n* is removed from the disc array 70) or in RAID0, the drive removal may be detected faster than the time assigned to the parameter maximum_drive_response_time. The removal of one of the drives 80*a*-80*n* may be determined even if there is no IO from the OS (e.g., a house keeping IO is sufficient to determine the drive removal). Also, the removal of one of the drives 80*a*-80*n* in one disc array may not affect the other disc arrays in the system 70. The present invention may be applied to any Operating System with a Soft RAID Solution, and may be expanded for other RAID implementations that are hardware or firmware based. If the present invention is implemented in firmware, the drive removal detection time would decrease and timeouts would be avoided.

The function performed by the block diagrams of FIGS. 2-3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICS, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disc including floppy disc, optical disc, CD-ROM, magneto-optical discs, ROMs, RAMs, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for responding to a particular drive being removed from a drive array, comprising the steps:
    (A) determining a maximum drive response time of said particular drive being removed from the drive array;
    (B) determining a duration of each of one or more commands needing completion;
    (C) if a particular one of the commands takes longer than said maximum drive response time, aborting the particular command and checking if said drive is physically present; and
    (D) if said command takes less than said maximum drive response time, completing said command, wherein said method detects and responds to said particular drive being removed before an operating system IO timeout has occurred.

2. The method according to claim 1, wherein said method provides a proactive response to said particular drive being removed.

3. The method according to claim 1, wherein said method is implemented in a redundant array of inexpensive discs (RAID) system.

4. The method according to claim 3, wherein said method improves the response time of said RAID system.

5. The method according to claim 1, wherein step (D) further includes reissuing the command if said particular drive is physically present.

6. The method according to claim 1, wherein said step (D) further includes sending another command to the remaining drives still physically present if said particular drive is not physically present.

7. A method for detecting and responding to the removal of one or more individual drives from a disc array, said method comprising:
    (A) storing one or more individual drives in a disc array;
    (B) establishing a maximum drive response time for said individual drives being removed from said disc array;
    (C) issuing a command to each of said one or more individual drives with a driver stored on a computer readable medium at a register start time;
    (D) determining if said command was executed by said one or more individual drives within said maximum drive response time with a command monitoring thread;
    (E) if said command is executed by said one or more individual drives at a time less than or equal to said maximum response time, repeating steps (C)-(D); and
    (F) if said command is not executed or executed by said one or more individual drives at a time greater than said maximum response time, checking whether said one or more drives are physically present, wherein said method detects and responds to said particular drive being removed before an operating system IO timeout has occurred.

8. The method according to claim 7, wherein step (F) includes reissuing said command if said one or more drives are physically present.

9. The method according to claim 7, wherein step (F) includes sending another command to the remaining individual drives still physically present if said one or more drives are not physically present.

10. An apparatus comprising:
    a disc array configured to send and receive data from a controller, said disc array comprising one or more drives;
    a driver stored on a computer readable medium for issuing a command to each of said drives; and
    a command monitoring thread stored in said drive and configured to (i) monitor said commands sent to each of said drives and (ii) determine whether said commands sent to each said drives are executed within a maximum drive response time, wherein said apparatus detects and responds to said particular drive being removed before an operating system IO timeout has occurred.

11. The apparatus according to claim 10, wherein said disc array comprises a redundant array of inexpensive discs (RAID) configuration.

12. A method for detecting and responding to the removal of one or more drives from a disc array, said method comprising:

(A) storing one or more drives in a disc array;
(B) establishing a maximum drive response time for said drives being removed from said disc array;
(C) issuing a command to each of said drives with a driver at a register start time;
(D) determining if said command was executed by said drives within said maximum drive response time with a command monitoring thread;
(E) if said command is executed by said drives at a time less than or equal to said maximum response time, repeating steps (C)-(D); and
(F) if said command is not executed, or executed by said drives at a time greater than said maximum response time, checking whether said one or more drives are physically present, wherein said method detects and responds to said particular drive being removed before an operating system IO timeout has occurred.

13. The method according to claim 12, wherein step (F) includes reissuing said command if said one or more drives are physically present.

14. The method according to claim 12, wherein step (F) includes sending a second command to the remaining drives still physically present when one or more of said drives are not physically present.

15. The method according to claim 14, wherein said method further includes completing said second command with an IO request by said remaining drives still physically present.

16. The method according to claim 12, wherein said method includes registering the register start time with said command monitoring thread.

17. The method according to claim 12, wherein step (F) includes aborting said command.

* * * * *